United States Patent
Imamura et al.

(10) Patent No.: US 12,263,831 B2
(45) Date of Patent: *Apr. 1, 2025

(54) DRIVE FORCE CONTROL SYSTEM FOR VEHICLE

(71) Applicant: TOYOTA JIDOSHA KABUSHIKI KAISHA, Toyota (JP)

(72) Inventors: Tatsuya Imamura, Okazaki (JP); Yoichiro Isami, Mishima (JP); Yoshio Itou, Susono (JP); Hiroyuki Amano, Susono (JP); Akiko Nishimine, Susono (JP); Hiroaki Ebuchi, Hadano (JP); Hiroaki Kodera, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,155

(22) Filed: May 3, 2024

(65) Prior Publication Data
US 2024/0300475 A1   Sep. 12, 2024

Related U.S. Application Data

(63) Continuation of application No. 17/371,194, filed on Jul. 9, 2021, now Pat. No. 11,993,250.

(30) Foreign Application Priority Data

Aug. 7, 2020   (JP) ................... 2020-134342

(51) Int. Cl.
*B60W 20/30*   (2016.01)
*B60W 10/06*   (2006.01)
(Continued)

(52) U.S. Cl.
CPC ............ *B60W 20/30* (2013.01); *B60W 10/06* (2013.01); *B60W 10/08* (2013.01);
(Continued)

(58) Field of Classification Search
CPC ...... B60W 20/30; B60W 10/06; B60W 10/08; B60W 10/111; B60W 20/15;
(Continued)

(56) References Cited

U.S. PATENT DOCUMENTS

| 7,954,593 | B2 | 6/2011 | Dornhege et al. |
| 11,993,250 | B2 * | 5/2024 | Imamura ............. B60L 50/60 |
| 2018/0281619 | A1 | 10/2018 | Suzuki et al. |

FOREIGN PATENT DOCUMENTS

| CN | 103260987 A | 8/2013 |
| DE | 102005030603 A1 | 3/2006 |

(Continued)

OTHER PUBLICATIONS

Machine Translation of CN 103260987A PDF file name: "CN103260987A_Machine_Translation.pdf".

(Continued)

*Primary Examiner* — Grant Moubry
*Assistant Examiner* — Ruben Picon-Feliciano
(74) *Attorney, Agent, or Firm* — Oliff PLC

(57) ABSTRACT

A drive force control system for a vehicle configured to accurately imitate a change in a drive force in a model vehicle. A drive torque simulator computes a virtual drive torque supposed to be delivered to drive wheels of the model vehicle in response to a manual operation to manipulate the vehicle, based on torque changing factors of a powertrain of the model vehicle. An actual torque calculator computes a target torque of a motor that is practically delivered to the drive wheels in the vehicle based on the virtual drive torque computed by the drive torque simulator, taking account of torque changing factors of the powertrain of the vehicle.

14 Claims, 6 Drawing Sheets

(51) Int. Cl.
*B60W 10/08* (2006.01)
*B60W 10/111* (2012.01)
*B60W 20/15* (2016.01)

(52) U.S. Cl.
CPC ........... *B60W 10/111* (2013.01); *B60W 20/15* (2016.01); *B60W 2540/10* (2013.01); *B60W 2540/14* (2013.01); *B60W 2710/083* (2013.01); *B60W 2710/105* (2013.01)

(58) Field of Classification Search
CPC ......... B60W 2540/10; B60W 2540/14; B60W 2710/083; B60W 2710/105
See application file for complete search history.

(56) References Cited

FOREIGN PATENT DOCUMENTS

| | | |
|---|---|---|
| JP | 2012-166682 A | 9/2012 |
| JP | 2018-166386 A | 10/2018 |
| JP | 2018-191366 A | 11/2018 |

OTHER PUBLICATIONS

Machine Translation of DE102005030603A1 PDF file Name: "DE102005030603A1_Machine_Translation.pdf".
Jan. 24, 2023 Office Action issued in U.S. Appl. No. 17/371,194.
Jul. 14, 2023 Office Action issued in U.S. Appl. No. 17/371,194.
Jan. 26, 2024 Notice of Allowance issued in U.S. Appl. 17/371,194.

* cited by examiner

FIG. 6

| MODE | CLUTCH | SLEEVE |
|---|---|---|
| FIRST MODE | ON | ON |
| SECOND MODE | OFF/SLIP | ON |
| THIRD MODE | OFF/SLIP | OFF |
| FOURTH MODE | ON | OFF |

DRIVE FORCE CONTROL SYSTEM FOR VEHICLE

CROSS-REFERENCE TO RELATED APPLICATIONS

This application is a continuation of application Ser. No. 17/371,194, filed Jul. 9, 2021, which claims the benefit of Japanese Patent Application No. 2020-134342 filed on Aug. 7, 2020 with the Japanese Patent Office, the entire contents of each of which is hereby incorporated by reference.

BACKGROUND

Field of the Invention

Embodiments of the present disclosure relate to the art of a drive force control system for a vehicle having an electric motor as a prime mover.

Discussion of the Related Art

JP-A-2012-166682 describes a control system for a hybrid vehicle in which a prime mover includes an engine and a motor. The hybrid vehicle described in JP-A-2012-166682 is provided with a transmission that shifts a gear stage thereof in response to a manual shifting operation. The control system taught by JP-A-2012-166682 is configured to control output characteristics of the motor in accordance with output characteristics of the engine in such a manner as to give the same shift feel as a manual shifting operation in a vehicle in which only an engine serves as a prime mover. According to the teachings of JP-A-2012-166682, specifically, the control system is configured to set a time constant and a dead time in accordance with an engine speed or a gear stage, and control a required output power of the motor by applying a response delay processing to a predetermined required output power of the motor based on the time constant and the dead time.

JP-A-2018-166386 and JP-A-2018-191366 individually describe a vehicle in which a torque is transmitted from a motor as a prime mover to drive wheels without passing through a geared transmission. The vehicles described in the above-mentioned prior art documents are individually provided with a motor controller that performs a pseudo shift change. The motor controller described in JP-A-2018-166386 is configured to perform a torque variation control to temporarily decrease and then increase torque of a drive motor, in response to a predetermined trigger for performing a pseudo shift change. On the other hand, the motor controller described in JP-A-2018-191366 is configured to perform frequency variation control to change a carrier frequency of an inverter connected to a drive motor, in response to a predetermined trigger for performing a pseudo shift change. According to the teachings of JP-A-2018-191366, the trigger for performing the pseudo shift change includes a vehicle speed, a position of an accelerator pedal, a depressing speed of the accelerator pedal, and a depression of a brake pedal.

As described, according to the teachings of JP-A-2012-166682, the control system taught by JP-A-2012-166682 is configured to control an output power of the motor based on the time constant and the dead time set based on an engine speed or a gear stage. According to the teachings of JP-A-2012-166682, therefore, a motor torque may be changed in a similar fashion to a change in an engine torque, taking account of a response delay in the engine torque. However, not only a function but also a structure of the transmission arranged between the motor and the drive wheels in a hybrid vehicle or an electric vehicle are different from those of a transmission arranged between the motor and the drive wheels in a vehicle in which only the engine serves as a prime mover. That is, even if the output torque of the motor is changed in a similar fashion to a change in the engine torque, the output torque of the motor may not be changed exactly in the same fashion to a change in the engine torque due to difference in the structures of the transmissions. For this reason, it may not be possible to imitate the shift feel of a manual transmission by the transmission arranged in the hybrid vehicle.

If the motor torque is decreased temporarily in response to the predetermined trigger as taught by JP-A-2018-166386, a drive force is reduced temporarily so that the driver is allowed to feel a virtual shift shock as might be caused by an actuation of a clutch. However, the torque transmitted from the prime mover to the drive wheels is not governed only by activations of devices interposed between the prime mover and the drive wheels. For this reason, in the vehicle taught by JP-A-2018-166386, a drive force to propel the vehicle may not be changed in a similar fashion to a change in a drive force as might be caused by a manual shifting operation executed in the vehicle having a manual transmission.

SUMMARY

Aspects of embodiments of the present disclosure have been conceived noting the foregoing technical problems, and it is therefore an object of the present disclosure to provide a drive force control system for a vehicle configured to accurately imitate a change in a drive force in a model vehicle.

According to the exemplary embodiment of the present disclosure, there is provided a drive force control system for a vehicle that controls a drive force to propel the vehicle in which a powertrain includes a motor as a prime mover and a power transmission device that transmits an output torque of the motor to a pair of drive wheels. Specifically, drive force control system controls the drive force to propel the vehicle in such a manner as to imitate behaviors of a model vehicle in which a powertrain thereof includes an engine as a prime mover and a transmission that transmits an output torque of the engine to a pair of drive wheels. In order to achieve the above-explained objective, according to the exemplary embodiment of the present disclosure, the control system is provided with a controller comprising a drive torque simulator and an actual torque calculator. The drive torque simulator is configured to compute a virtual drive torque supposed to be delivered to the drive wheels of the model vehicle in response to a manual operation of a driver to manipulate the vehicle, based on at least one of torque changing factors such as an inertia moment, an elastic coefficient, and an attenuation coefficient of the powertrain of the model vehicle. The actual torque calculator is configured to compute a target torque of the motor that is practically delivered from the motor to the drive wheels in the vehicle based on the virtual drive torque computed by the drive torque simulator, taking account of at least one of torque changing factors such as an inertia moment, an elastic coefficient, and an attenuation coefficient of the powertrain of the vehicle.

In a non-limiting embodiment, the transmission of the model vehicle may include an automatic transmission that changes a speed ratio between the engine and the drive wheels automatically.

In a non-limiting embodiment, the transmission of the model vehicle may include a manual transmission that changes a speed ratio between the engine and the drive wheels in response to a manual shifting operation.

In a non-limiting embodiment, the vehicle may comprise a clutch pedal operated by the driver, and the manual shifting operation includes an operation of the clutch pedal.

In a non-limiting embodiment, the controller may further comprise a target torque simulator configured to compute a target value of a virtual torque supposed to be generated by the engine of the model vehicle by operating an accelerator pedal of the vehicle. In addition, the drive torque simulator may be further configured to compute the virtual drive torque supposed to be delivered to the drive wheels of the model vehicle if the engine generates the virtual torque computed by the target torque simulator.

Thus, according to the exemplary embodiment of the present disclosure, a change in the virtual drive torque supposed to be delivered from the engine to the front wheels in the powertrain of the model vehicle is simulated based on at least one of the torque changing factors such as the inertia moment, the elastic coefficient, and the attenuation coefficient of the powertrain of the model vehicle, in response to a manual operation of the driver to manipulate the vehicle. The target torque of the motor that is practically delivered from the motor to the drive wheels in the vehicle is computed based on the virtual drive torque computed by the drive torque simulator, taking account of at least one of torque changing factors such as an inertia moment, an elastic coefficient, and an attenuation coefficient of the powertrain of the vehicle. According to the exemplary embodiment of the present disclosure, therefore, the torque of the motor delivered to the drive wheels in the vehicle may be controlled in line with the simulated change in the virtual drive torque. For this reason, behaviors of the model vehicle having the engine and the transmission may be imitated by the vehicle as an electric vehicle, in response to a manual operation of the driver to manipulate the vehicle. That is, the driver may enjoy the driving pleasures of driving the vehicle, as if driving the model vehicle.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 6 is a table indicating operating modes selectable in the model vehicle shown in FIG. 2.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

Figure 1:
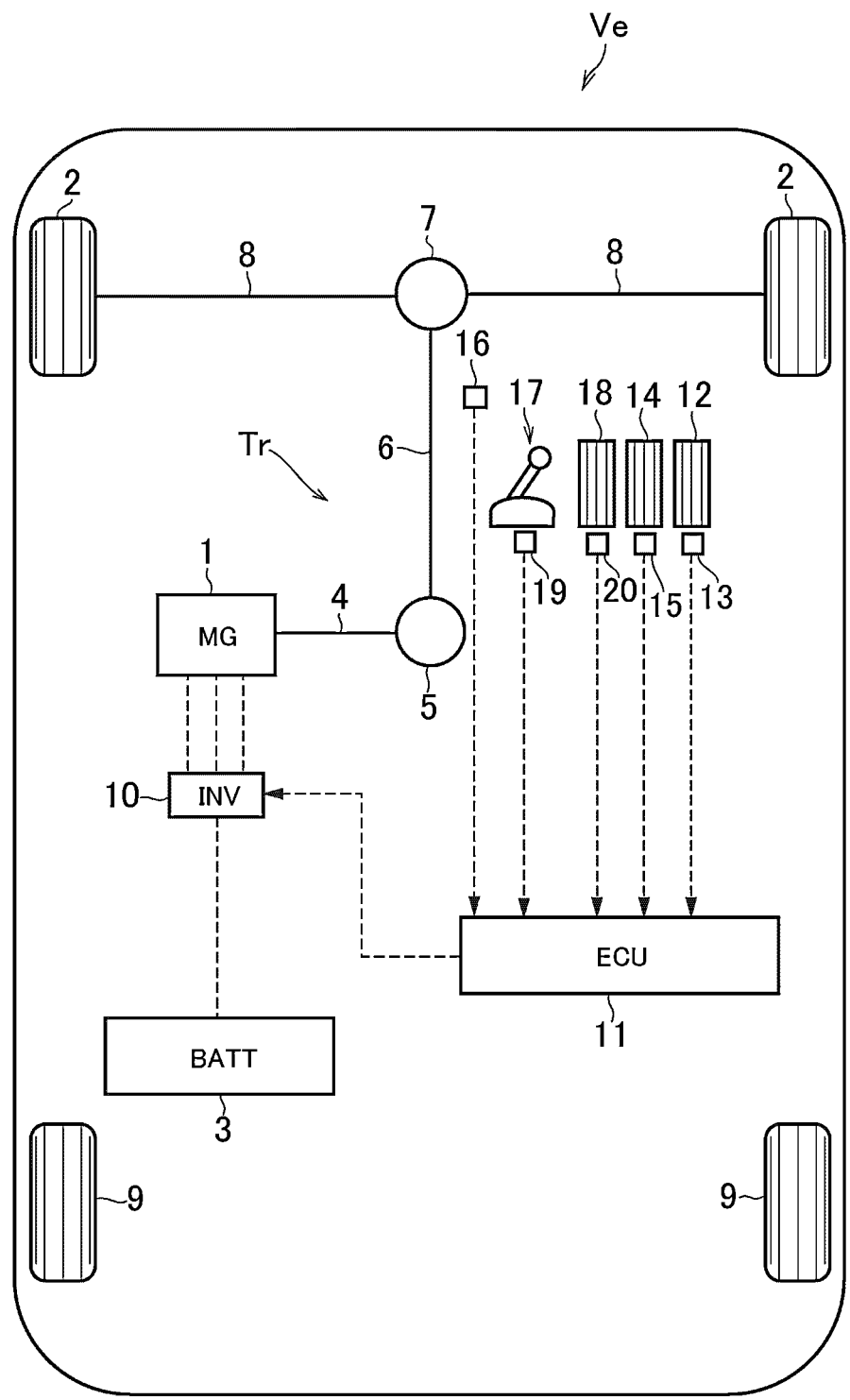
FIG. 1 is a schematic illustration showing a structure of a vehicle to which the control system according to the exemplary embodiment of the present disclosure is applied.

Referring now to FIG. 1, there is shown one example of a powertrain Tr of a vehicle Ve to which the control system according to the embodiment of the present disclosure is applied. The vehicle Ve shown in FIG. 1 is a front drive layout electric vehicle propelled by delivering an output torque of a motor (referred to as "MG" in FIG. 1) 1 as a prime mover to a pair of front wheels 2. According to the exemplary embodiment of the present disclosure, a motor/generator that serves not only as a motor but also as a generator is adopted as the motor 1. Specifically, the motor 1 serves as a motor to generate a drive torque to propel the vehicle Ve by supplying electric power to the motor 1 from an electric storage device (referred to as "BATT" in FIG. 1) 3. The motor 1 also serves as a generator to translate kinetic power into electric power by generating a torque in a direction to reduce a rotational speed of the motor 1. For example, a synchronous motor and an induction motor may be employed as the motor 1. Accordingly, the motor 1 serves as a "rotary machine" of the exemplary embodiment of the present disclosure.

An output shaft 4 of the motor 1 is connected to one end of a propeller shaft 6 through a gear unit 5, and other end of the propeller shaft 6 is connected to a differential gear unit 7. That is, the output torque of the motor 1 is distributed to right and left driveshafts 8 through the differential gear unit 7, and further distributed to the front wheels 2 through the driveshafts 8. Instead, the control system according to the exemplary embodiment of the present disclosure may also be applied to a rear-drive layout electric vehicle in which the output torque of the motor 1 is delivered to a pair of rear wheels 9, or a four-wheel-drive layout electric vehicle in which the output torque of the motor 1 is distributed to the front wheels 2 and the rear wheels 9 though a transfer.

The motor 1 is provided with an inverter (referred to as "INV" in FIG. 1) 10 so that a magnitude and a frequency of electric current supplied to each phase of the motor 1 are controlled by the inverter 10. As an option, an auxiliary such as a converter may be arranged to boost a voltage of electric power supplied from the electric storage device 3. In addition, the electric storage device 3 may include a secondary battery such as a lithium-ion battery and an electronic component such as a capacitor.

In order to control switch elements of the inverter 10 and so on, the vehicle Ve is provided with an electronic control unit (to be abbreviated as the "ECU" hereinafter) 11 as a controller. The ECU 11 comprises a microcomputer as its main constituent configured to perform calculation based on incident data from sensors and formulas as well as maps install in advance, and to transmit calculation results in the form of command signals to e.g., the inverter 10.

For example, in the vehicle Ve shown in FIG. 1, the ECU 11 receives detection signals from: an accelerator sensor 13 that detects a position and an operating speed of an accelerator pedal 12; a brake sensor 15 that detects a depression of a brake pedal 14 and a pedal force applied to the brake pedal 14; and a vehicle speed sensor 16 that detects a rotational speed of the propeller shaft 6 (i.e., a vehicle speed).

The ECU 11 is configured to control the vehicle Ve in such a manner as to imitate behaviors of a conventional vehicle having a manual transmission that changes a speed ratio between an engine and drive wheels in response to a manual shifting operation. To this end, the vehicle Ve is provided with a shift lever 17 that is operated to shift an after-mentioned virtual gear stage, and a clutch pedal 18. According to the exemplary embodiment of the present disclosure, the virtual gear stage may be selected from six forward stages, a reverse stage, and a neutral stage. In order to imitate a shifting behavior of the vehicle having a manual transmission, the ECU 11 also receives detection signals from: a shift position sensor 19 that detects a position of the shift lever 17; and a clutch position sensor 20 that detects a depression of the clutch pedal 18. In addition, a detection signal of a rotational angle of a steering wheel may also be sent from a steering sensor (neither of which are shown) to the ECU 11. Further, in order to assist a steering torque to rotate the steering wheel, the ECU 11 may also transmit a command signal to an actuator of a steering motor (not shown).

An operating mode of the vehicle Ve may be selected from a normal mode and a manual mode. Specifically, in the normal mode, a drive force to propel the vehicle Ve is generated in accordance with a position of the accelerator pedal 12 and a brake force to decelerate the vehicle Ve is generated in accordance with a depression of the brake pedal 14, without requiring to operate the shift lever 17. On the other hand, in the manual mode, the above-mentioned virtual gear stage is selected in accordance with a position of the shift lever 17, and the drive force and the brake force are changed in accordance with the selected virtual gear stage.

That is, in the manual mode, the vehicle Ve is propelled while imitating behaviors of the conventional vehicle having an engine and a manual transmission. In the manual mode, specifically, the virtual gear stage is shifted by manipulating the shift lever 17 while depressing the clutch pedal 18, and the motor 1 is operated in such a manner as to generate a torque in accordance with the selected virtual gear stage, a position or an operating amount of the accelerator pedal 12, and a depression of the clutch pedal 18. To this end, the ECU 11 computes a virtual engine speed based on a speed of the vehicle Ve in the selected virtual gear stage, and emits an imitation engine noise as a sound effect from a speaker (not shown) in accordance with the computed virtual engine speed.

Figure 2:
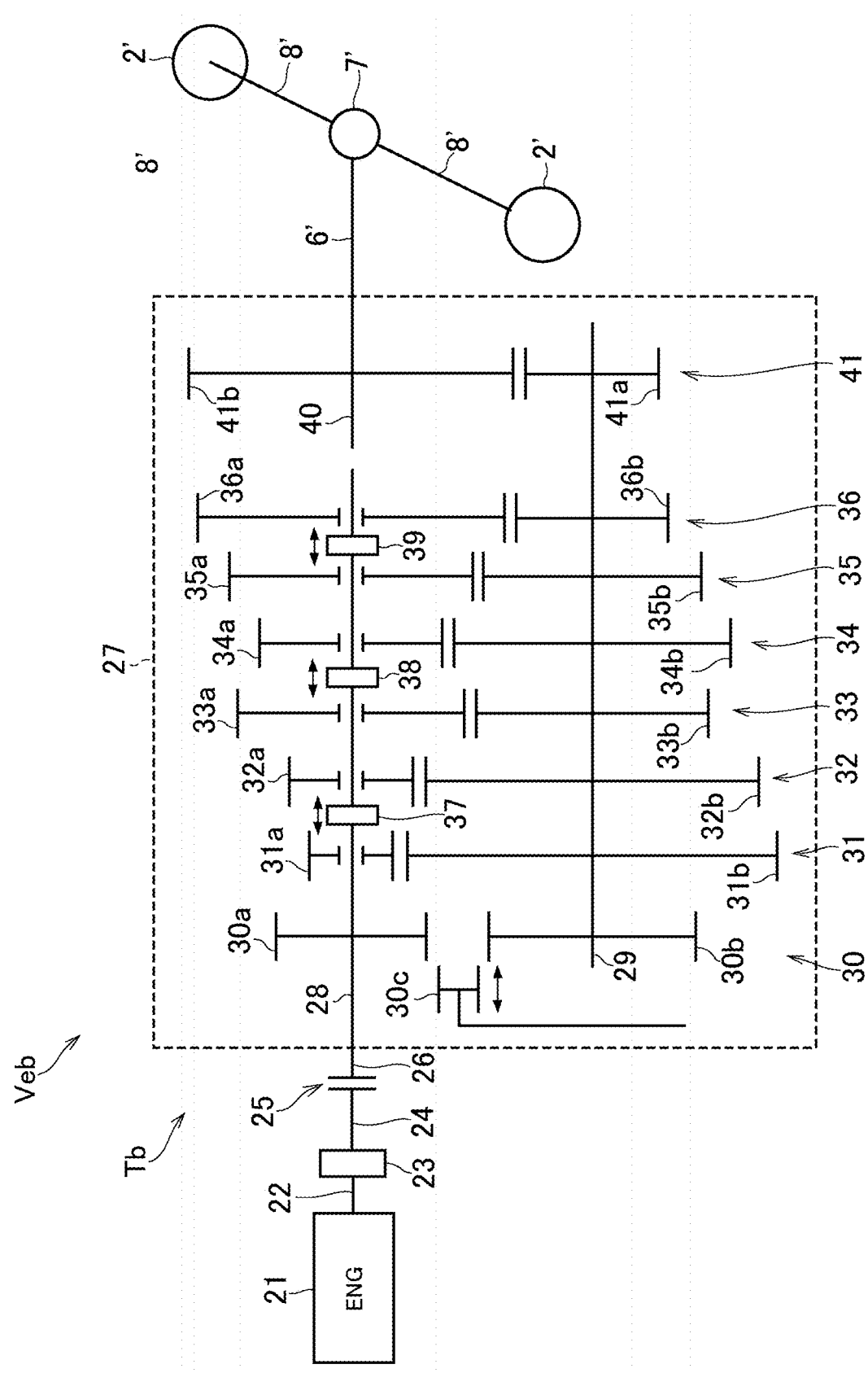
FIG. 2 is a schematic illustration showing a structure of a model vehicle whose behavior is imitated by the control system according to the exemplary embodiment of the present disclosure.

Turning to FIG. 2, there is shown one example of a powertrain Tb of a model vehicle Veb as a base model of the conventional vehicle having an engine and a manual transmission, and according to the exemplary embodiment of the present disclosure, the ECU 11 is configured to imitate the behavior of the model vehicle Veb during propulsion of the vehicle Ve in the manual mode. According to the example shown in FIG. 2, the model vehicle Veb comprises an engine (referred to as "ENG" in FIG. 2) 21 such as a gasoline engine or a diesel engine whose output torque is changed by controlling fuel injection and air intake.

In order to absorb torsional vibrations resulting from pulsation of an output torque of the engine 21, an output shaft 22 of the engine 21 is connected to a damper 23. For example, a mass damper such as a flywheel and a spring damper having compression springs arranged in a circular manner may be adopted as the damper 23. According to the example shown in FIG. 2, the damper 23 is formed by combining the mass damper with the spring damper.

A clutch 25 is disposed on an output shaft 24 of the damper 23 so that the output torque of the engine 21 is delivered to a manual transmission (as will be simply called the "transmission" hereinafter) 27 through an output shaft 26 of the clutch 25. In the clutch 25, a clutch disc is brought into engagement with a rotary member opposed thereto by returning the clutch pedal 18 so that the output torque of the engine 21 is transmitted to the transmission 27. The clutch disc is disengaged from the rotary member opposed thereto by depressing the clutch pedal 18 so that the torque transmission between the engine 21 and the transmission 27 is interrupted. That is, a contact pressure of the clutch disc is changed in accordance with a position of the clutch pedal 18, and when the clutch disc is partially engaged with the rotary member opposed thereto, the output torque of the engine 21 is partially transmitted to the transmission 27 in accordance with the contact pressure of the clutch disc.

According to the example shown in FIG. 2, a gear stage of the transmission 27 may be selected from six forward stages and a reverse stage.

The transmission 27 comprises an input shaft 28 joined to the output shaft 26 of the clutch 25, a counter shaft 29 extending parallel to the input shaft 28, and gears for establishing gear stages.

Specifically, the transmission 27 comprises: a reverse gear set 30 for establishing the reverse stage; a first gear pair 31 for establishing the first forward stage; a second gear pair 32 for establishing the second forward stage; a fourth gear pair 33 for establishing the fourth forward stage; a third gear pair 34 for establishing the third forward stage; a fifth gear pair 35 for establishing the fifth forward stage; and a sixth gear pair 36 for establishing the sixth forward stage. As illustrated in FIG. 2, in the transmission 27, the reverse gear set 30, the first gear pair 31, the second gear pair 32, the fourth gear pair 33, the third gear pair 34, the fifth gear pair 35, and the sixth gear pair 36 are arranged downstream of the output shaft 26 in order.

The reverse gear set 30 comprises: a reverse drive gear 30a that is mounted on the input shaft 28 to be rotated integrally with the input shaft 28; a reverse driven gear 30b that is mounted on the counter shaft 29 to be rotated integrally with the counter shaft 29; and a counter gear 30c that is selectively moved between an engagement position and a standby position. Specifically, the counter gear 30c is moved to the engagement position to be engaged with the reverse drive gear 30a and the reverse driven gear 30b by moving the shift lever 17 to a reverse position, and to the standby position to be disengaged from the reverse drive gear 30a and the reverse driven gear 30b by moving the shift lever 17 to a position other than the reverse position.

The first gear pair 31 comprises: a first drive gear 31a fitted onto the input shaft 28 while being allowed to rotate relatively to the input shaft 28; and a first driven gear 31b mounted on the counter shaft 29 to be rotated integrally with the counter shaft 29 and to be meshed with the first drive gear 31a.

The second gear pair 32 comprises: a second drive gear 32a fitted onto the input shaft 28 while being allowed to rotate relatively to the input shaft 28; and a second driven gear 32b mounted on the counter shaft 29 to be rotated integrally with the counter shaft 29 and to be meshed with the second drive gear 32a.

A first sleeve 37 is mounted on the input shaft 28 between the first drive gear 31a and the second drive gear 32a. For example, when the first sleeve 37 is shifted by a shift fork (not shown) to be engaged with the first drive gear 31a, the first drive gear 31a is rotated integrally with the input shaft 28. By contrast, when the first sleeve 37 is shifted by the shift fork to be engaged with the second drive gear 32a, the second drive gear 32a is rotated integrally with the input shaft 28. Optionally, the first sleeve 37 may be provided with a synchronizer that matches a speed of the input shaft 28 with a speed of the first drive gear 31a or the second drive gear 32a.

The third gear pair 34 comprises: a third drive gear 34a fitted onto the input shaft 28 while being allowed to rotate relatively to the input shaft 28; and a third driven gear 34b mounted on the counter shaft 29 to be rotated integrally with the counter shaft 29 and to be meshed with the third drive gear 34a.

The fourth gear pair 33 comprises: a fourth drive gear 33a fitted onto the input shaft 28 while being allowed to rotate relatively to the input shaft 28; and a fourth driven gear 33b mounted on the counter shaft 29 to be rotated integrally with the counter shaft 29 and to be meshed with the fourth drive gear 33a.

A second sleeve 38 is mounted on the input shaft 28 between the third drive gear 34a and the fourth drive gear 33a. For example, when the second sleeve 38 is shifted by the shift fork to be engaged with the third drive gear 34a, the third drive gear 34a is rotated integrally with the input shaft 28. By contrast, when the second sleeve 38 is shifted by the shift fork to be engaged with the fourth drive gear 33a, the fourth drive gear 33a is rotated integrally with the input shaft 28. Optionally, the second sleeve 38 may be provided with a synchronizer that matches a speed of the input shaft 28 with a speed of the third drive gear 34a or the fourth drive gear 33a.

The fifth gear pair 35 comprises: a fifth drive gear 35a fitted onto the input shaft 28 while being allowed to rotate relatively to the input shaft 28; and a fifth driven gear 35b mounted on the counter shaft 29 to be rotated integrally with the counter shaft 29 and to be meshed with the fifth drive gear 35a.

The sixth gear pair 36 comprises: a sixth drive gear 36a fitted onto the input shaft 28 while being allowed to rotate relatively to the input shaft 28; and a sixth driven gear 36b mounted on the counter shaft 29 to be rotated integrally with the counter shaft 29 and to be meshed with the sixth drive gear 36a.

A third sleeve 39 is mounted on the input shaft 28 between the fifth drive gear 35a and the sixth drive gear 36a. For example, when the third sleeve 39 is shifted by the shift fork to be engaged with the fifth drive gear 35a, the fifth drive gear 35a is rotated integrally with the input shaft 28. By contrast, when the third sleeve 39 is shifted by the shift fork to be engaged with the sixth drive gear 36a, the sixth drive gear 36a is rotated integrally with the input shaft 28. Optionally, the sixth drive gear 36a may be provided with a synchronizer that matches a speed of the input shaft 28 with a speed of the third drive gear 34a fifth drive gear 35a or the sixth drive gear 36a.

An output shaft 40 of the transmission 27 extends parallel to the counter shaft 29, and the output shaft 40 is connected to the counter shaft 29 through a reduction gear pair 41 comprising a reduction drive gear 41a and a reduction driven gear 41b. Specifically, the reduction drive gear 41a is mounted on the counter shaft 29 to be rotated integrally with the counter shaft 29, and the reduction driven gear 41b is mounted on the output shaft 40 to be rotated integrally with the output shaft 40 and to be meshed with the reduction drive gear 41a. The reduction drive gear 41a is diametrically smaller than the reduction driven gear 41b so that a torque of the counter shaft 29 is delivered to the output shaft 40 while being multiplied.

The output shaft 40 is connected to a pair of front wheels 2' through a propeller shaft 6', a differential gear unit 7', and driveshafts 8'. That is, the model vehicle Veb shown in FIG. 2 is a front drive layout vehicle.

Thus, a structure of the powertrain Tr of the vehicle Ve shown in FIG. 1 to which the control system according to the exemplary embodiment of the present disclosure is applied is different from a structure of the powertrain Tb of the model vehicle Veb shown in FIG. 2 as a base model of the behavior to be imitated by the control system according to the exemplary embodiment of the present disclosure. Specifically, in the powertrain Tr of the vehicle Ve shown in FIG. 1, the torque of the motor 1 is transmitted to the front wheels 2 through a power transmission device including the output shaft 4, the gear unit 5 and so on. On the other hand, in the powertrain Tb of the model vehicle Veb shown in FIG. 2, the torque of the engine 21 is transmitted to the front wheels 2' through the damper 23, the clutch 25, the transmission 27 and so on. That is, even if the output torque of the motor 1 is increased to accelerate the vehicle Ve in the same manner as an increase in the output torque of the engine 21 of the model vehicle Veb, the output torque of the motor 1 will not be increased exactly in the same manner as the increase in the output torque of the engine 21 due to a difference in e.g., an inertia moment of the motor 1 and an inertia moment of the engine 21. In addition, a torsional stiffness of the powertrain Tr of the vehicle Ve is also different from a torsional stiffness of the powertrain Tb of the model vehicle Veb. For these reasons, a magnitude of a torque to be delivered to the front wheels 2 in the vehicle Ve by generating a predetermined torque by the motor 1 is different from a magnitude of a torque to be delivered to the front wheels 2' in the model vehicle Veb by generating the predetermined torque by the engine 21. Likewise, inertia moments of rotary members in the powertrain Tr rotated passively during coasting of the vehicle Ve are also different from inertia moments of rotary members in the powertrain Tb rotated passively during coasting of the model vehicle Veb. For this reason, a deceleration of the vehicle Ve during coasting is also different from a deceleration of the model vehicle Veb during coasting. Thus, the torque to be delivered to the front wheels 2 in the vehicle Ve is different from the torque to be delivered to the front wheels 2' in the model vehicle Veb due to difference in torque changing factors between the powertrain Tr of the vehicle Ve and the powertrain Tb of the model vehicle Veb.

In order to imitate the behavior of the model vehicle Veb during propulsion of the vehicle Ve in the manual mode, the ECU 11 is configured to set a target torque of the motor 1 such that the torque delivered to the front wheels 2 is changed in the similar manner as a change in the torque delivered to the front wheels 2' in the model vehicle Veb.

Figure 3:
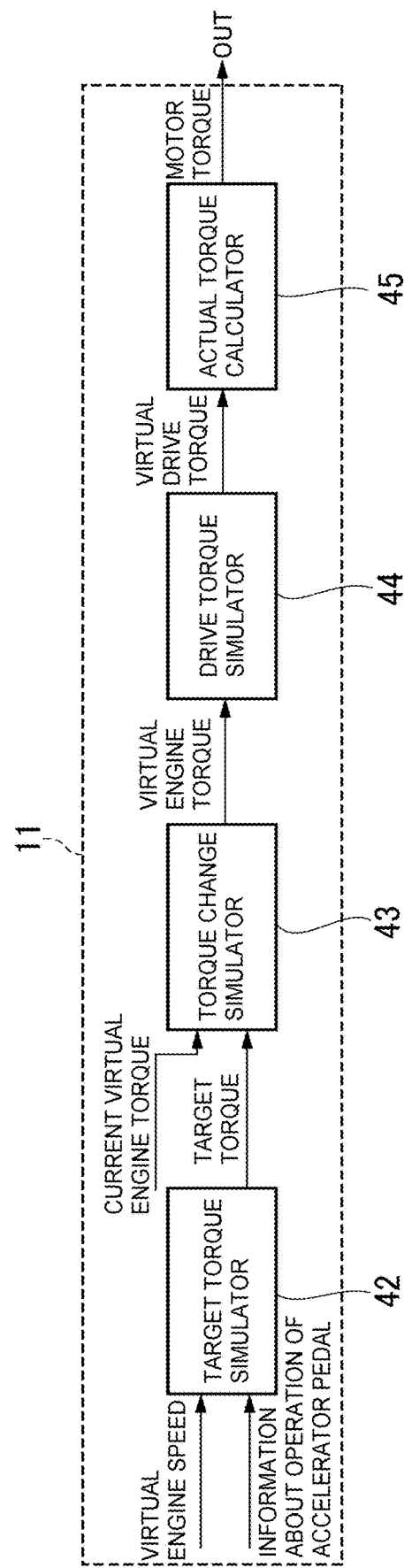
FIG. 3 is a block diagram schematically showing functions of the drive force control system according to the exemplary embodiment of the present disclosure.

A structure and functions of the ECU 11 are shown in FIG. 3 in detail. As shown in FIG. 3, the ECU 11 comprises a target torque simulator 42, a torque change simulator 43, a drive torque simulator 44, and an actual target torque calculator 45.

The target torque simulator 42 is configured to compute a target value of a virtual torque supposed to be generated by the engine 21 of the model vehicle Veb by operating the accelerator pedal 12 of the vehicle Ve. Specifically, the target value of a virtual torque of the engine 21 is set with reference to a map for determining the virtual target torque installed in the ECU 11 based on a current position (or operating amount) of the accelerator pedal 12 and the virtual speed of the engine 21.

The torque change simulator 43 is configured to simulate a temporal change in the virtual torque of the engine 21 toward the target value in accordance with the operation of the accelerator pedal 12. To this end, specifically, the torque change simulator 43 computes the virtual torque of the engine 21 at predetermined time intervals in the process of changing the virtual torque to the target value.

The drive torque simulator 44 is configured to compute a virtual drive torque supposed to be delivered to the front wheels 2' of the model vehicle Veb if the engine 21 generates the virtual torque computed by the torque change simulator 43. Specifically, the drive torque simulator 44 computes the virtual drive torque taking account of an inertia moment, an elastic coefficient, and an attenuation coefficient of the powertrain Tb of the model vehicle Veb, as well as a torque transmitting capacity of the clutch 25 and engagement states of the sleeves 37, 38, and 39.

The actual target torque calculator 45 is configured to compute a target torque of the motor 1 that is practically delivered from the motor 1 to the front wheels 2 in the vehicle Ve in accordance with the operation of the accelerator pedal 12, taking account of an inertia moment, an elastic coefficient, and an attenuation coefficient of the powertrain Tr of the vehicle Ve.

Figure 4:
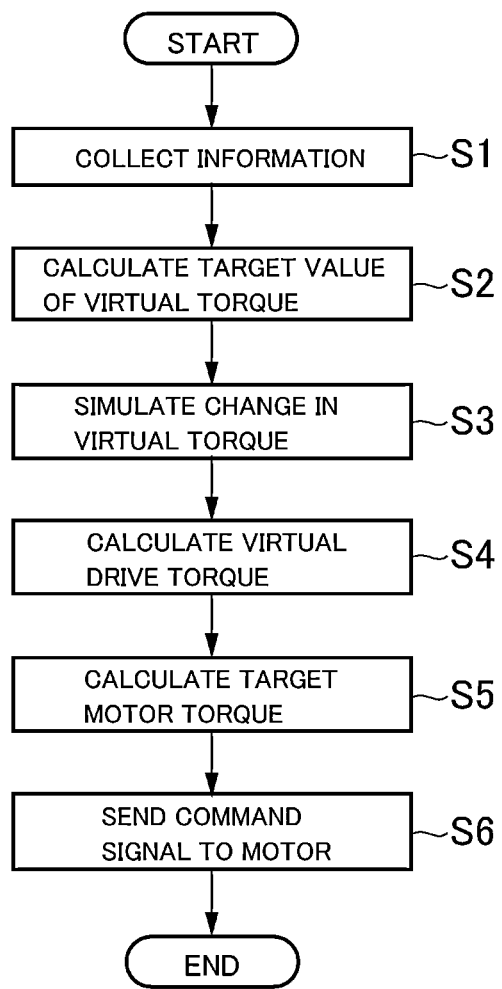
FIG. 4 is a flowchart showing one example of a routine executed by the drive force control system according to the exemplary embodiment of the present disclosure.

Procedures to control the motor 1 during propulsion of the vehicle Ve in the manual mode are shown in FIG. 4. At step S1, information about an operation of the accelerator pedal 12, a speed of the vehicle Ve, a position of the shift lever 17 and so on is collected. As described, such information may be collected by the accelerator sensor 13, the vehicle speed sensor 16, the shift position sensor 19, the clutch position sensor 20 and so on.

At step S2, the target torque simulator 42 computes a target value of the virtual torque supposed to be generated by the engine 21 of the model vehicle Veb based on the information collected at step S1. As described, the map for determining the virtual target torque is installed in the ECU 11, and the target value of the virtual torque is determined with reference to the map based on the current position of the accelerator pedal 12 and the virtual speed of the engine 21. For example, given that the clutch pedal 18 is not depressed in the vehicle Ve, the virtual speed of the engine 21 is calculated based on: a current speed of the vehicle Ve; and a virtual speed ratio supposed to be achieved in the current virtual gear stage of the transmission 27 selected based on a position of the shift lever 17. By contrast, given that the clutch pedal 18 is depressed in the vehicle Ve, the virtual speed of the engine 21 is calculated by adding an amount of change in the virtual speed of the engine 21 supposed to be changed by depressing the clutch pedal 18 to the virtual speed of the engine 21 calculated at step S2 in the previous routine. For example, the amount of change in the virtual speed of the engine 21 may be calculated based on a virtual torque of the engine 21 calculated at the aftermentioned step S3 in the previous routine and a virtual torque transmitting capacity of the clutch 25 governed by a depression of the clutch pedal 18. If the current routine is the first routine since the operating mode of the vehicle Ve is shifted to the manual mode, the amount of change in the virtual speed of the engine 21 may be calculated based on the current speed of the vehicle Ve and a virtual speed ratio of the transmission 27. Given that the accelerator pedal 12 is not depressed, a brake torque is supposed to be established by the engine 21 and the model vehicle Ve is supposed to be decelerated by an engine braking derived from the brake torque. In this case, therefore, the target torque simulator 42 computes a target value of a virtual brake torque supposed to be generated by the engine 21 of the model vehicle Veb.

At step S3, the torque change simulator 43 computes the virtual torque of the engine 21 at predetermined time intervals in the process of changing the virtual torque to the target value. That is, the torque change simulator 43 simulates a temporal change in the virtual torque of the engine 21 taking account of a response delay in the virtual torque governed by change rates of opening degrees of a throttle valve and EGR valve (neither of which are shown) of the engine 21.

At step S4, the drive torque simulator 44 computes a virtual drive torque supposed to be delivered to the front wheels 2' of the model vehicle Veb if the engine 21 generates the virtual torque computed at step S3. In other words, the drive torque simulator 44 computes a virtual drive torque supposed to be delivered to the front wheels 2' of the model vehicle Veb in the process of changing the virtual torque of the engine 21 to the target value. Specifically, the virtual drive torque may be computed using a motion equation of the powertrain Tb of the model vehicle Veb.

Figure 5:
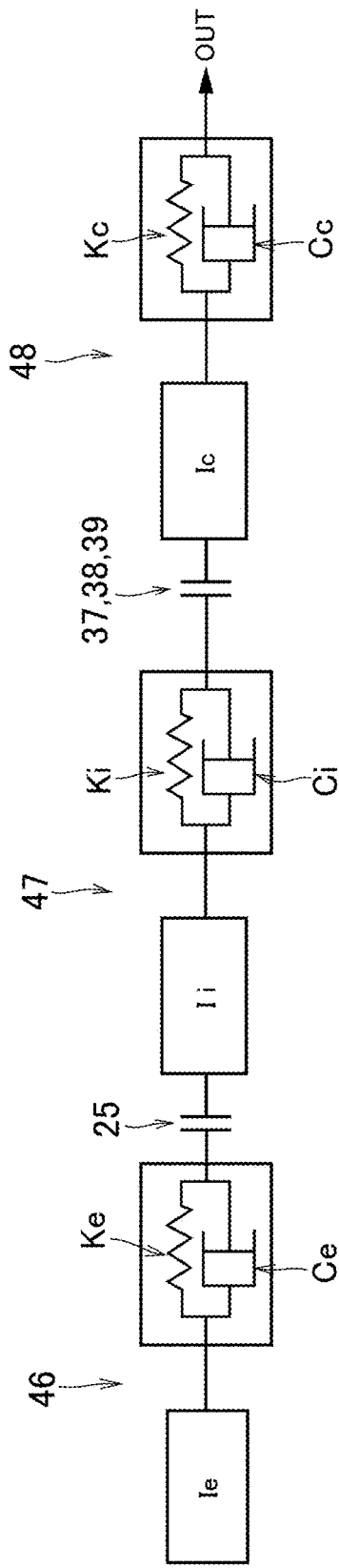
FIG. 5 is a schematic illustration showing parameters affecting a torque transmitted from an engine to drive wheels.

Turing to FIG. 5, there are shown parameters affecting the torque delivered to the front wheels 2' in the model vehicle Veb. In FIG. 5, the powertrain Tb of the model vehicle Veb is divided into an input section 46 including rotary members of upstream of the clutch 25, an intermediate section 47 including rotary members rotated integrally with the input shaft 28, and an output section 48 including rotary members rotated integrally with the counter shaft 29.

In the input section 46, "Ie" represents a total inertia moment, "Ke" represents a total elastic coefficient, and "Ce" represents a total attenuation coefficient of the rotary members including the engine 21 and the damper 23. In the intermediate section 47, "Ii" represents a total inertia moment, "Ki" represents a total elastic coefficient, and "Ci" represents a total attenuation coefficient of the rotary members including the sleeves 37, 38, and 39, and the reverse drive gear 30a. In the output section 48, "Ic" represents a total inertia moment, "Kc" represents a total elastic coefficient, and "Cc" represents a total attenuation coefficient of the rotary members including the driven gears 30b, 31b, 32b, 33b, 34b, 35b, and 36b, and the reduction gear pair 41.

Specifically, a motion equation (1) of the input section 46 may be expressed as:

$$Ie \cdot d\omega e / dt = Te - be \cdot \omega e - \text{Tcl\_in}. \qquad (1)$$

Likewise, a motion equation (2) of the intermediate section 47 may be expressed as:

$$Ii \cdot d\omega i / dt = \text{Tcl\_in} - bi \cdot \omega i - \text{Tc\_in}. \qquad (2)$$

Similarly, a motion equation (3) of the output section 48 may be expressed as:

$$IC \cdot d\omega c / dt = \text{Tc\_in} - bc \cdot \omega c - R/L. \qquad (3)$$

In the motion equation (1) of the input section 46, "Te" is a torque generated by the engine 21, "we" is a rotational speed of the input section 46, "be" is a coefficient collectively representing the total elastic coefficient "Ke" and the total attenuation coefficient "Ce" to be converted to a torque, and "Tcl_in" is an input torque to the clutch 25. In the motion equation (2) of the intermediate section 47, "ωi" is a rotational speed of the intermediate section 47, "bi" is a coefficient collectively representing the total elastic coefficient "Ki" and the total attenuation coefficient "Ci" to be converted to a torque, and "Tc_in" is an input torque to the sleeve 37, 38, or 39. In the motion equation (3) of the output section 48, "ωc" is a rotational speed of the output section 48, "bc" is a coefficient collectively representing the total elastic coefficient "Kc" and the total attenuation coefficient "Cc" to be converted to a torque, and "R/L" is a torque delivered to the front wheels 2'.

As described, the clutch 25 may be engaged and disengaged completely, but also engaged partially while slipping. On the other hand, the sleeves 37, 38, and 39 are selectively engaged and disengaged to/from the drive gears 31a, 32a, 33a, 34a, 35a, and 36a. Accordingly, an operating mode of the model vehicle Veb may be categorized into first to fourth modes shown in FIG. 6. Specifically, in the first mode, the model vehicle Veb is propelled while completely engaging the clutch 25, and engaging any one of the sleeves 37, 38, and 39 with any one of the drive gears 31a, 32a, 33a, 34a, 35a, and 36a. In the second mode, the model vehicle Veb is propelled while depressing a clutch pedal (not shown) so that the clutch 25 is engaged partially while slipping or disengaged, and engaging any one of the sleeves 37, 38, and 39 with any one of the drive gears 31a, 32a, 33a, 34a, 35a, and 36a. In the third mode, the model vehicle Veb is propelled while depressing the clutch pedal so that the clutch 25 is engaged partially while slipping or disengaged, and engaging none of the sleeves 37, 38, and 39 with any one of the drive gears 31a, 32a, 33a, 34a, 35a, and 36a so that the transmission 27 is in a neutral stage. In the fourth mode, the model vehicle Veb is stopped while positioning a shift lever (not shown) to a neutral position, engaging the clutch 25 completely, and engaging none of the sleeves 37, 38, and 39 with any one of the drive gears 31a, 32a, 33a, 34a, 35a, and 36a.

Given that the input section 46, the intermediate section 47, and the output section 48 are rotated at a predetermined speed ω, the torque delivered to the front wheels 2' of the model vehicle Veb in the first mode may be calculated using the following formula (4):

$$(Ie + Ii + Ic) \cdot d\omega/dt = Te - (be + bi + bc) \cdot \omega - R/L. \tag{4}$$

In the same condition, the torque delivered to the front wheels 2' in the second mode may be calculated using the following formula (5):

$$(Ii + Ic) \cdot d\omega/dt = \text{Tcl\_in} - (bi + bc) \cdot \omega - R/L; \tag{5}$$

and the torque delivered to the front wheels 2' in the third mode and the fourth mode may be calculated using the following formula (6):

$$Ic \cdot d\omega/dt = -bc \cdot \omega - R/L. \tag{6}$$

Given that the clutch 25 is engaged partially while slipping, the torque Tcl of the clutch 25 in the formula (5) is changed in accordance with a torque transmitting capacity of the clutch 25. In this case, the input torque Tcl_in to the clutch 25 may be expressed as the following expression (7):

$$\text{Tcl\_in} = \pm k \cdot \text{Tclmax}; \tag{7}$$

where "k" is a torque transmitting capacity of the clutch 25 governed by a depression of the clutch pedal 18 and detected by the clutch position sensor 20, and "Tclmax" is a maximum torque transmitting capacity of the clutch 25. Specifically, the torque transmitting capacity of the clutch 25 varies within a range from 0 to 1.

Thus, at step S4, the virtual drive torque supposed to be delivered to the front wheels 2' of the model vehicle Veb in the current condition of the vehicle Ve is computed based on the virtual torque of the engine 21 simulated at step S3, a depression of the clutch pedal 18 detected by the clutch position sensor 20, a position of the shift lever 17 detected by the shift position sensor 19, and a speed of the vehicle Ve detect by the vehicle speed sensor 16. That is, the virtual drive torque supposed to be delivered to the front wheels 2' of the model vehicle Veb is simulated in response to a manual operation of the driver to manipulate the vehicle Ve.

Turning back to FIG. 4, at step S5, the actual target torque calculator 45 computes a target motor torque corresponding to the virtual drive torque calculated at step S4, which is to be delivered from the motor 1 to the front wheels 2. Specifically, as the virtual drive torque calculated at step S4, the target motor torque to be generated by the motor 1 is calculated using the following motion equation (8) of the powertrain Tr of the vehicle Ve:

$$Im \cdot d\omega m/dt = Tm - bm \cdot \omega m - R/L. \tag{8}$$

In the motion equation (8) of the powertrain Tr, "ωm" is a rotational speed of the motor 1, "Im" is a total inertia moment of the rotary members rotated integrally with the motor 1 including the output shaft 4 and the gear unit 5, and "bm" is a coefficient collectively representing a total elastic coefficient and a total attenuation coefficient of the abovementioned rotary members to be converted to a torque.

At step S5, the ECU 11 transmits a command signal to the inverter 10 so as to generate the target motor torque calculated at step S5 by the motor 1, and thereafter the routine returns.

In a case that the shift lever 17 is positioned at a neutral position and the clutch pedal 18 is depressed completely, the ECU 11 determines that the driver intends to operate the vehicle Ve in the neutral stage. In this case, the virtual drive torque supposed to be delivered to the front wheels 2' of the model vehicle Veb may be computed without talking account of the virtual torque supposed to be generated by the engine 21. In this case, therefore, the routine progresses directly from step S1 to step S4 by skipping steps S2 and S3.

Thus, according to the exemplary embodiment of the present disclosure, a change in the virtual drive torque supposed to be delivered from the engine 21 to the front wheels 2' in the powertrain Tb of the model vehicle Veb is simulated based on at least one of the torque changing factors such as the inertia moment, the elastic coefficient, and the attenuation coefficient of the powertrain Tb, in response to a manual operation of the driver to manipulate the vehicle Ve. According to the exemplary embodiment of the present disclosure, therefore, the torque of the motor 1 delivered to the front wheels 2 in the vehicle Ve may be controlled in line with the simulated change in the virtual drive torque. For this reason, behaviors of the model vehicle Veb having the engine 21 and the transmission 27 may be imitated by the vehicle Ve as an electric vehicle, in response to a manual operation of the driver to manipulate the vehicle Ve. That is, the driver may enjoy the driving pleasures of driving the vehicle Ve, as if driving the model vehicle Veb having the engine 21 and the transmission 27.

As described, according to the exemplary embodiment of the present disclosure, the drive torque delivered to the front wheels 2 is calculated taking account of a virtual torque transmitting capacity of the clutch 25 of the model vehicle Veb. According to the exemplary embodiment of the present disclosure, therefore, the drive torque may be changed in response to an operation of the clutch pedal 18.

For example, when the accelerator pedal 12 is returned without depressing the clutch pedal 18, the torque corresponding to the engine braking torque supposed to be established in the model vehicle Veb by the engine 21 is applied from the motor 1 to the front wheels 2. According to the exemplary embodiment of the present disclosure, not only the drive torque but also the brake torque delivered to the front wheels 2 are changed in accordance with a depression of the clutch pedal 18. By contrast, when the clutch pedal 18 is depressed completely without depressing the accelerator pedal 12, the torque corresponding to the engine braking torque supposed to be established in the model vehicle Veb by the engine 21 will not be applied to the front wheels 2. Thus, according to the exemplary embodiment of the present disclosure, the behaviors of the model vehicle Veb having the engine 21 and the transmission 27 may be simulated accurately by the vehicle Ve as an electric vehicle.

Although the above exemplary embodiment of the present disclosure has been described, it will be understood by those skilled in the art that the present disclosure should not be limited to the described exemplary embodiments, and various changes and modifications can be made within the scope of the present disclosure. For example, the control system according to the present disclosure may also be adapted to imitate behaviors of a conventional vehicle having an automatic transmission that changes a speed ratio between an engine and drive wheels automatically.

In addition, the control system according to the present disclosure may also be applied to a hybrid vehicle in which a prime mover includes an engine and a motor. In the hybrid vehicles, a torque of the engine and a torque of the motor are delivered to the drive wheels through different route. In this case, specifically, the control system simulates a change in the torque of the engine 21 of the model vehicle Veb supposed to be delivered to the front wheels 2' during propulsion in an electric vehicle mode, based on a torque changing factor of a torque transmitting routine between the motor and the front wheels. In this case, therefore, the shift lever 17 and the clutch pedal 18 may be omitted.

According to the foregoing embodiment, the drive torque delivered to the front wheels 2 from the motor 1 is calculated taking account of the inertia moment, the elastic coefficient, and an attenuation coefficient of the powertrain Tb of the model vehicle Veb. However, the drive torque delivered to the front wheels 2 from the motor 1 may also be calculated taking account at least any one of those torque changing factors.

For example, a type of the model vehicle to be simulated may be selected from the above-mentioned model vehicles by manipulating a switch arranged in an instrument panel, or a touch screen of a control panel. Further, the behaviors of the model vehicle Veb to be simulated may be customized according to the driver's preference, by changing characteristics of the engine 21, the damper 23, the transmission 27 and so on.

What is claimed is:

1. A drive force control system for a vehicle that controls a drive force to propel the vehicle in which a first powertrain includes a motor as a prime mover and a power transmission device that transmits an output torque of the motor to a pair of drive wheels to imitate behaviors of a model vehicle in which a second powertrain different from the first powertrain is provided, the drive force control system comprising:

a controller that controls the output torque of the motor, wherein
   the controller comprises:
   a drive torque simulator that models the behaviors of the model vehicle and is configured to compute a virtual drive torque corresponding to what would be delivered to the drive wheels of the model vehicle in response to a manual operation of a driver to manipulate the vehicle, based on at least one of torque changing factors including a second inertia moment, a second elastic coefficient, and/or a second attenuation coefficient of the second powertrain of the model vehicle; and
   an actual torque calculator configured to compute a target torque of the motor that is practically delivered from the motor to the drive wheels in the vehicle based on the virtual drive torque computed by the drive torque simulator, taking account of at least one of torque changing factors including a first inertia moment, a first elastic coefficient, and a first attenuation coefficient of the first powertrain of the vehicle; and
   the vehicle comprises a switching device that changes the at least one of the torque changing factors of the second powertrain.

2. The drive force control system for the vehicle as claimed in claim 1,
   wherein the vehicle further comprises an instrument panel or a control panel, and
   the switching device includes a switch arranged in the instrument panel or a touch screen of the control panel.

3. The drive force control system for the vehicle as claimed in claim 1,
   wherein the second powertrain includes a prime mover and a transmission, and
   the transmission of the model vehicle includes a manual transmission that changes a speed ratio between the prime mover and the drive wheels in response to a manual shifting operation.

4. The drive force control system for the vehicle as claimed in claim 3, wherein the vehicle comprises a shifting device that is operated by the driver to select the speed ratio of the manual transmission.

5. The drive force control system for the vehicle as claimed in claim 3,
   wherein the vehicle further comprises a clutch pedal, and
   the manual shifting operation includes an operation of the clutch pedal.

6. The drive force control system for the vehicle as claimed in claim 1,
wherein the second powertrain includes a prime mover,
the controller further comprises a target torque simulator configured to compute a target value of a virtual torque to be generated by the prime mover of the model vehicle by operating an accelerator pedal of the vehicle, and
the drive torque simulator is further configured to compute the virtual drive torque to be delivered to the drive wheels of the model vehicle if the prime mover generates the virtual torque computed by the target torque simulator.

7. The drive force control system for the vehicle as claimed in claim 1,
wherein the vehicle includes a four-wheel-drive layout vehicle in which the output torque of the motor is distributed to a pair of front wheels and a pair of rear wheels.

8. A drive force control system for a vehicle that controls a drive force to propel the vehicle in which a first powertrain includes a motor as a prime mover and a power transmission device that transmits an output torque of the motor to a pair of drive wheels to imitate behaviors of a model vehicle in which a second powertrain includes a prime mover and a transmission that transmits an output torque of the prime mover to a pair of drive wheels, the drive force control system comprising:
a controller that controls the output torque of the motor, wherein
the controller comprises:
a drive torque simulator that models the behaviors of the model vehicle and is configured to compute a virtual drive torque corresponding to what would be delivered to the drive wheels of the model vehicle in response to a manual operation of a driver to manipulate the vehicle, based on at least one of torque changing factors including a second inertia moment, a second elastic coefficient, and/or a second attenuation coefficient of the second powertrain of the model vehicle; and
an actual torque calculator configured to compute a target torque of the motor that is practically delivered from the motor to the drive wheels in the vehicle based on the virtual drive torque computed by the drive torque simulator, taking account of at least one of torque changing factors including a first inertia moment, a first elastic coefficient, and a first attenuation coefficient of the first powertrain of the vehicle,
the transmission of the model vehicle includes a manual transmission that changes a speed ratio between the prime mover and the drive wheels in response to a manual shifting operation, and
the vehicle comprises a shifting device that is operated by the driver to select the speed ratio of the manual transmission.

9. The drive force control system for the vehicle as claimed in claim 8,
wherein the vehicle includes a four-wheel-drive layout vehicle in which the output torque of the motor is distributed to a pair of front wheels and a pair of rear wheels.

10. The drive force control system for the vehicle as claimed in claim 8,
wherein the vehicle comprises a clutch pedal operated by the driver, and
the manual shifting operation includes an operation of the clutch pedal.

11. The drive force control system for the vehicle as claimed in claim 8,
wherein the controller further comprises a target torque simulator configured to compute a target value of a virtual torque to be generated by the prime mover of the model vehicle by operating an accelerator pedal of the vehicle, and
the drive torque simulator is further configured to compute the virtual drive torque to be delivered to the drive wheels of the model vehicle if the prime mover generates the virtual torque computed by the target torque simulator.

12. A drive force control method for a vehicle that controls a drive force to propel the vehicle in which a first powertrain includes a motor as a prime mover and a power transmission device that transmits an output torque of the motor to a pair of drive wheels to imitate behaviors of a model vehicle in which a second powertrain different from the first powertrain is provided, the drive force control method comprising:
computing, by a drive torque simulator that models the behaviors of the model vehicle, a virtual drive torque corresponding to what would be delivered to the drive wheels of the model vehicle in response to a manual operation of a driver to manipulate the vehicle, based on at least one of torque changing factors including a second inertia moment, a second elastic coefficient, and/or a second attenuation coefficient of the second powertrain of the model vehicle; and
thereafter computing, by an actual torque calculator, a target torque of the motor that is practically delivered from the motor to the drive wheels in the vehicle based on the virtual drive torque computed by the drive torque simulator, taking account of at least one of torque changing factors including a first inertia moment, a first elastic coefficient, and a first attenuation coefficient of the first powertrain of the vehicle.

13. The drive force control method for the vehicle as claimed in claim 12,
wherein the second powertrain includes a prime mover,
the drive force control method further comprises:
computing, by a target torque simulator, a target value of a virtual torque to be generated by the prime mover of the model vehicle by operating an accelerator pedal of the vehicle; and
computing, by the drive torque simulator, the virtual drive torque to be delivered to the drive wheels of the model vehicle if the prime mover generates the virtual torque computed by the target torque simulator.

14. The drive force control method for the vehicle as claimed in claim 13, further comprising:
computing, by a torque change simulator, the virtual torque of the prime mover at predetermined time intervals in a process of changing the virtual torque of the prime mover to the target value computed by the target torque simulator.

* * * * *